SELF-PULSING MAGNETIC AMPLIFIER

Filed April 20, 1960

BY Francis A. Varallo
AGENT

United States Patent Office 3,117,235

Patented Jan. 7, 1964

3,117,235

SELF-PULSING MAGNETIC AMPLIFIER

Edward W. Young, Philadelphia, Pa., assignor to Burroughs Corporation, Detroit, Mich., a corporation of Michigan Filed Apr. 20, 1960, Ser. No. 23,438

10 Claims. (Cl. 307—88)

This invention relates to magnetic amplifiers and more particularly to a bidirectional self-pulsing magnetic amplifier device.

Magnetic amplifiers are well-known in the electronics art and have become recognized as basic components for use in control, data processing and computing applications. In accordance with an operational feature of present day magnetic amplifiers, the elements thereof are energized by power pulses supplied from an external alternating current source. Such power pulses cooperate with input or control pulses to selectively produce or inhibit an output from the amplifier device.

In contrast to the mode of operation of these present day devices, the instant invention utilizes no external alternating current source, thereby effecting considerable economies in the number of components required in the system in which it is employed. Concomitant advantages include simplicity of design, savings in space and increased system dependability.

Accordingly it is a general object of the present invention to provide an improved magnetic amplifier device.

Another object of the present invention is to provide a magnetic amplifier which does not require an external alternating current source to supply power pulses thereto.

Still another object of the present invention is to provide a magnetic amplifier having the combined features of simplicity, efficiency and economy.

A further object of the instant invention is to provide a magnetic amplifier capable of selectively effecting bidirectional current flow through a load impedance.

A more specific object of the present invention is to provide a magnetic amplifier which utilizes a single transistor regeneratively coupled to the magnetic elements of the amplifier device.

In accomplishing the foregoing objects and advantages the instant invention utilizes a pair of bistable magnetic elements, each having a plurality of windings coupled thereto. The operational cycle of the present device includes a regenerative phase and a control phase. In the former phase, regenerative means which re-cycle unconditionally are provided to switch the magnetic elements to their respective predetermined remanent states. Means are provided for causing a control signal current to flow through at least one of the windings associated with each of said magnetic elements. During the control phase of the operational cycle this control current co-operates with reset means for partially switching each of the magnetic elements toward magnetic remanent states opposite to those of said predetermined states—the respective magnitudes of the magnetic flux reset in said elements during the control phase being a function of the polarity and amplitude of the control current. In the subsequent regenerative phase of operation, the unequal times required by said regenerative means to switch said magnetic elements back to their predetermined stable states, results in an output pulse across the load impedance of the magnetic amplifier circuit. This output pulse is proportional in width and amplitude to the difference in the degree of resetting of the magnetic elements during the control phase; while the polarity of the output pulse is dependent upon the polarity of the control current.

The foregoing features, objects and operation of the invention will become more fully apparent from the following description and accompanying drawings in which.

Before proceeding with a detailed analysis of the circuit it will be helpful to review the notation used in connection with the schematic diagram. As hereinbefore mentioned, the instant invention makes use of magnetic elements. These elements are assumed to have substantially rectangular hysteresis loop characteristics. Magnetic elements having these properties are capable of being rapidly switched from one of two possible conditions of magnetization to the other by a magnetizing force exerted by associated electrical windings. These elements additionally are capable of remaining in their last assumed magnetic condition after the force which caused the condition has subsided. Information of opposite polarity to be stored in the elements is arbitrarily designated in the binary notation "1" and "0." The magnetic elements are depicted as circles and it is assumed that these circles represent magnetic cores having essentially rectangular hysteresis loop characteristics. Although the magnetic elements are depicted herein as being toroidal in form, it is understood that the invention is not limited to elements of this particular geometry, but may include other forms of magnetic storage elements. Each of the magnetic cores is supplied with windings for producing a magnetic flux therein in response to current flow through these windings. A dot is placed at the end of each of these windings to indicate that that end has a negative polarity during read-in of a binary "1," and a positive polarity during read-out of a binary "1." Thus as current flows into the dotted winding terminal the core associated with such winding will tend to store a "0." Conversely, if the current flows into an undotted winding terminal the core associated with such winding will tend to store a "1."

Figure 1:
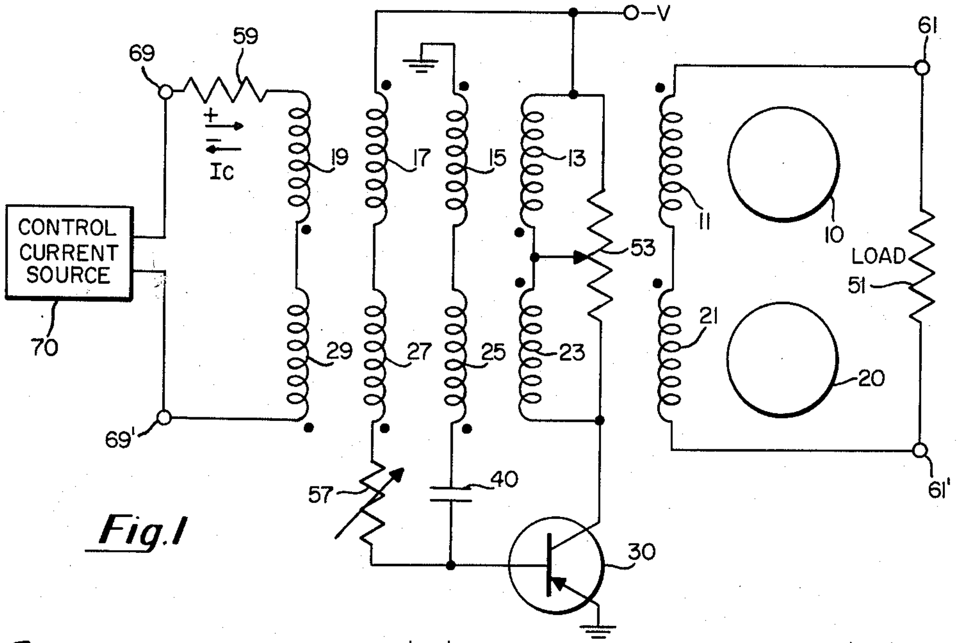
FIG. 1 is a schematic diagram of a magnetic amplifier constructed in accordance with the instant invention.
Figure 2:
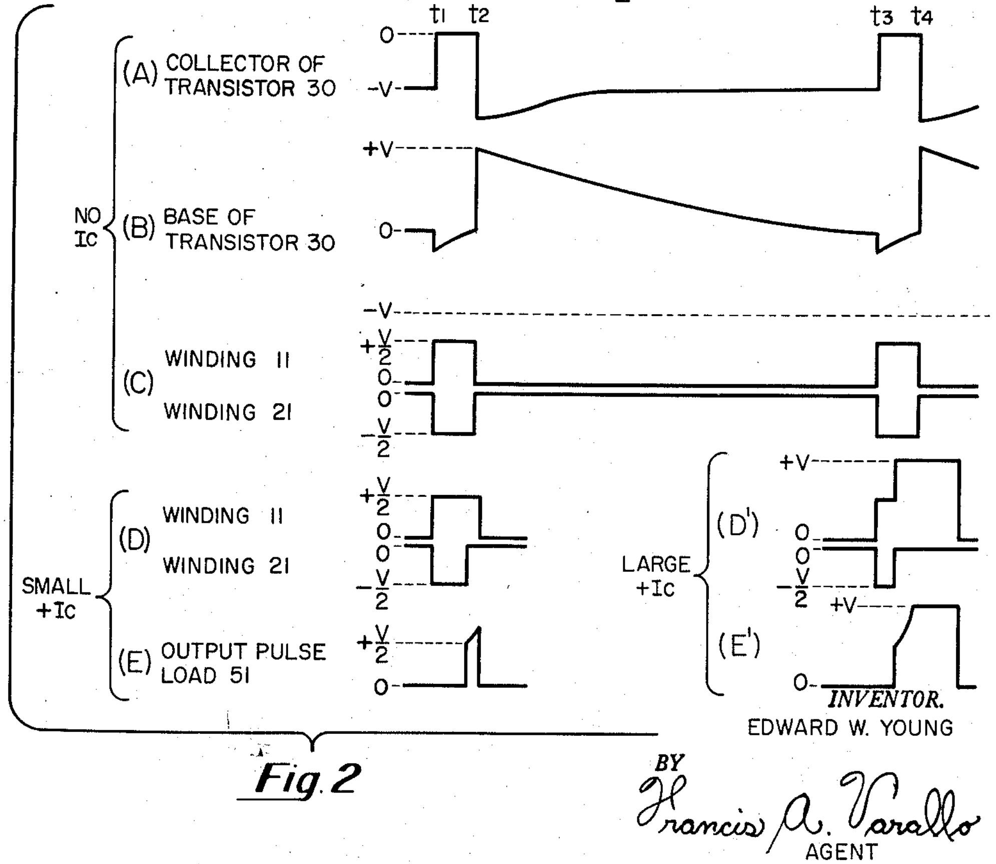
FIG. 2 (A through E') are waveform diagrams illustrating the operation of the circuit of FIG. 1.

The transistor element depicted in the embodiment of FIG. 1 is a junction PNP type. The invention should not be considered limited to the use of transistors but may employ other current amplifying devices. In addition other types of transistors may be utilized in accordance with established design procedures well-known to those skilled in the art. The negative supply voltage for the transistor has been designated −V. The plus and minus signs appearing on the voltage waveforms of FIG. 2 represent absolute polarities with respect to ground reference while the amplitudes of the waveforms are given in terms of the absolute value, V, of the supply voltage.

In consideration of FIG. 1 there are shown two binary magnetic storage elements 10 and 20. Coupled to magnetic element 10 are output winding 11, switching winding 13, regenerative winding 15, reset winding 17 and control winding 19. Likewise windings 21, 23, 25, 27 and 29 whose functions correspond respectively to those of windings 11, 13, 15, 17 and 19 are coupled to magnetic element 20. Load impedance 51 is connected across output terminals 61 and 61' and forms a series loop with output windings 11 and 21. A potentiometer 53 is connected in parallel with the series arrangement of switching windings 13 and 23. Conventional graphical symbols have been employed to designate the emitter, collector and base electrodes of a transistor 30. The collector of transistor 30 is connected to a source of potential −V, by way of the parallel combination of series windings 13, 23 and potentiometer 53. The series-connected regenerative windings 15 and 25 are coupled by means of capaictor 40 to the base of transistor 30. The base of transistor 30 is also returned to the −V supply by the series combination of a variable impedance 57 and reset windings 27 and 17. The control circuit comprises the impedance 59 in series with windings 19 and 29. Current source 70, connected across input terminals 69 and 69', is adapted to supply control current of either polarity to the control circuit Referring now to FIG. 1 in connection with the waveform diagrams of FIG. 2, the operation of the present invention will be explained in detail. It will be assumed that as a result of the preceding cycle of operation the magnetic fluxes of elements 10 and 20 have been reset respectively toward the "1" and "0" states. At time $t_1$, the beginning of the regenerative phase of the present operation cycle, transistor 30 commences conduction. Current flows out of the collector electrode and through windings 23 and 13 and potentiometer 53 to the collector supply —V. The collector current flowing into the dotted terminal of winding 13 tends to switch core 10 to the "0" state; while current flow into the undotted terminal of winding 23 tends to switch core 20 to the "1" state. As cores 10 and 20 begin to switch respectively to the "0" and "1" states, voltages are induced in regenerative windings 15 and 25. The polarity of these induced voltages is such that the dotted end of winding 25 is negative with respects to its undotted end, and the undotted end of winding 15 is negative with respect to its dotted end. It should be noted that the voltages induced in windings 15 and 25 will be additive and that the negative potential applied thereby to the base of transistor 30 is regenerative with respect to the conduction of the transistor. Assuming that regenerative windings 15 and 25 have respectively the same number of turns as switching windings 13 and 23, the combined voltage induced in windings 15 and 25 and applied to capacitor 40 has an absolute magnitude V. However, the input capacitance of transistor 30 and the forward biasing of the base-emitter junction thereof, prevent the base of transistor 30 from going more than a few tenths of a volt negative. This slight regenerative voltage maintains the conduction of transistor 30 as long as either element 10 or 20, or both elements are switching. Capacitor 40 charges to a voltage level having an absolute value, V. At time $t_2$ both cores 10 and 20 have completed switching to their respective predetermined "0" and "1" states. Since there is no longer a change in the magnetic flux of cores 10 and 20, the regenerative voltage induced in windings 15 and 25 terminates abruptly. The negative voltage, —V, applied to the terminal of capacitor 40, which is connected to the dotted end of winding 25, terminates and is replaced by ground or reference potential. This change represents a positive shift in voltage of magnitude V, applied to capacitor 40. Since capacitor 40 cannot discharge instantaneously, the terminal of capacitor 40 connected to the base of transistor 30, which had been slightly negative, i.e., just below ground potential, during the regenerative phase, shifts in a positive direction by an equal amount, V volts. This abrupt change in potential on the base of transistor 30 is depicted in FIG. 2B at times $t_2$ and $t_4$. The voltage level at which the charge on capacitor 40 is standing, is shifted in a positive direction. This positive-going shift is reflected as a relatively large positive potential applied to the base of transistor 30 and is capable of turning the transistor Off. The voltages appearing respectively on the collector and base electrodes of transistor 30 are depicted in FIGS. 2A and 2B. The latter waveforms correspond to the circuit conditions of FIG. 2C, viz., no control current. The aforementioned turning Off of transistor 30 occurs at time $t_2$.

The cessation of conduction of transistor 30 initiates the control phase of the operational cycle. Capacitor 40 begins to discharge in the series path which includes variable resistor 57, reset windings 27 and 17, the internal impedance of the —V supply and regenerative windings 15 and 25. The discharge of capacitor 40 is toward the potential of the —V supply, and is indicated by the voltage waveform on the base of transistor 30, as seen in FIG. 2B, in the interval between times $t_2$ and $t_3$. The discharge current flowing into the dotted terminal of winding 27 tends to drive core 20 from the "1" state toward the "0" state and to an alternate reset condition, while the current through winding 17 tends to drive core 10 from the "0" state toward the "1" state and to its reset condition. The magnetomotive force, M.M.F., applied to elements 10 and 20 as a result of the discharge current flow through windings 15 and 25 opposes the resetting M.M.F. provided by the same current flow through reset windings 17 and 27. In practice, however, the number of turns of windings 17 and 27 respectively are chosen to be greater than those of windings 15 and 25 so as to offset the effect of such opposition. Assuming that the current source 70 supplies no control current $I_c$, the degree to which the magnetic flux of each of the cores 10 and 20 is reset is the same, provided, of course, that windings 17 and 27 each have an equal number of turns. The actual magnitude of the flux reset in each of the cores is a function of the values of variable resistor 57 and capacitor 40.

Capacitor 40 continues to discharge toward the —V potential and at time $t_3$ the potential existing on the base electrode of transistor 30 becomes slightly negative, i.e., just below ground potential. At this point transistor 30 is biased to conduction and the next regenerative phase of the amplifier commences. The frequency of operation of the amplifier is dependent upon the values of capacitor 40 and resistor 57.

As previously noted the collector current of transistor 30 drives core 20 to the "1" state and core 10 to the "0" state. Since in the absence of control signal current, each of the cores had been reset by an equal amount, the times required to switch the cores from their reset conditions to their respective predetermined remanent states are identical. Output windings 11 and 21, as well as windings 13 and 23, are assumed to have an equal number of turns. Therefore, the voltages induced respectively across windings 11 and 21 have similar amplitudes and durations, but are opposite in phase. Therefore no difference in potential exists across the load impedance 51. The termination of the regenerative phase occurs at time $t_4$.

The voltages appearing respectively across output windings 11 and 21 are depicted in FIG. 2C. The absolute amplitudes of each of these voltages is one half of V, since the voltage appearing across each of the switching windings 13 and 23 during the conduction of transistor 30 is half the supply voltage —V. Potentiometer 53 serves as a voltage divider across windings 13 and 23. The setting of the movable contact of potentiometer 53 determines the magnitude of the switching current flowing respectively through the latter windings. In practice the potentiometer is adjusted such that in the absence of control signal current, the durations of the switching times for cores 10 and 20 will be the same and no voltage difference will appear across load 51.

The previous operational cycle assumed that no control current, $I_c$, was supplied by source 70. The effect of such control current on the circuit operation will now be considered. Assume that during the control phase of the operational cycle, while capacitor 40 is discharging through reset windings 27 and 17, control current, $I_c$, is flowing from source 70 into terminal 69, through current limiting resistor 59 and control windings 19 and 29 and thence back to the source by way of terminal 69'. Such control current flow may arbitrarily be assigned a positive polarity. The control current flowing into the undotted terminal of winding 19 tends to switch core 10 toward the "1" state, thereby aiding the reset current flowing through winding 17 which also tends to switch core 10 to the same state. However, control current flowing into the undotted terminal of winding 29 tends to keep core 20 in the "1" state, in opposition to the effect of the reset current flowing through winding 27 which tends to switch core 20 toward the "0" state. The overall result of the positive control current is to aid the resetting of core 10 and hinder the resetting of core 20. Under these conditions, during the succeeding regenerative cycle, the times required to switch cores 10 and 20 to their predetermined stable states are no longer equal. Consequently the switching voltage pulses appearing across output windings 11 and 21 are not of equal duration. Such voltages are illustrated in FIGS. 2D and 2D′. Therefore core 10 is still switching toward the "0" state when core 20 has completed switching to the "1" state. As long as both cores are switching to their respective predetermined states, no output voltage is developed across load 51 as previously explained. However, when core 20 has completed switching and the voltage induced thereby across winding 21 has terminated, the voltage induced across winding 11 by the switching of core 10 appears across the load 51.

If the amplitude of the positive control current $+I_c$ supplied by source 70 is small, the dissimilarity in the magnitudes of the flux reset in the magnetic elements is also small. The narrow output pulse appearing across load 51, and depicted in FIG. 2E is representative of a small $+I_c$ and has an amplitude substantially equal to one-half V. However, if the positive control current is large, the difference in the durations of the switching times for cores 10 and 20 during the succeeding regenerative phase will also be large. Under these conditions when core 20 has completed switching to the "1" state, the impedance of switching winding 23 to the flow of collector current to transistor 30 becomes extremely low and the entire supply voltage $-V$ appears across winding 13. This voltage is reflected by transformer action to winding 11 and as a result the voltage across load 51 attains an amplitude substantially equal to V. This output pulse is depicted in FIG. 2E′. It should be noted that a finite time is required before the voltage across load 51 attains its full V amplitude. Where there are only slight differences in the switching times of the magnetic elements, as occurs when the amplitude of the control current is small, there is insufficient time for the output voltage to reach the $-V$ potential. Succinctly stated, the output pulse of the present magnetic amplifier is proportional in width and amplitude to the difference in the amounts of magnetic flux reset during the preceding control phase.

If control current $I_c$ flows in a negative direction, i.e., into the dotted terminal of windings 29 and 19, it will aid the resetting of core 20 toward the "0" state and inhibit the resetting of core 10 toward the "1" state. In this case, during the next regenerative phase, core 10 will be completely switched to its "0" remanent state before core 20 has been switched to its "1" state. The voltage induced in output winding 21 after core 10 has completely switched to the "0" state appears across load impedance 51. However, this output voltage pulse is of opposite polarity to that appearing across load 51 as a result of the effect of a positive control current. The waveforms associated with a negative control current, $-I_c$, are similar to those of $+I_c$ with the exception that the pulses are negative-going. As was the case with small values of $+I_c$, small amplitudes of $-I_c$ result in narrow pulses of approximately one-half V amplitude. Large amplitudes of $-I_c$ result in comparatively wide output pulses of substantially V amplitude. Thus it is apparent that the polarity of the voltage appearing across load 51 depends upon the polarity of the input control current.

From the foregoing consideration of the operation of the circuit depicted in FIG. 1, it is readily apparent that the configuration of solid state electronic compents suggested by the instant invention results in efficient and dependable operation. With input control current amplitudes of one microampere D.C., output pulses of two amperes have been realized—this representing a current amplification of two million. These results are achieved with simplicity of design and economy of components.

Since other modifications varied to fit particular operating requirements will be apparent to those skilled in the art, the invention is not considered limited to the embodiment chosen for purposes of disclosure, and covers all changes and modifications which do not constitute departures from the true spirit and scope of this invention. Accordingly, all such variations as are in accord with the principles discussed previously are meant to fall within the scope of the appended claims.

What is claimed is:

1. A magnetic amplifier comprising a pair of magnetic elements each capable of assuming bistable states of magnetic remanence, a plurality of windings coupled to each of said magnetic elements, a current amplifying device operatively connected to cause current flow through a first pair of said windings coupled respectively to said magnetic elements and forming with a second pair of said windings coupled respectively to said magnetic elements a regeneratively coupled circuit, said circuit being adapted to switch said elements to respective predetermined opposite remanent states, control means connected to a third pair of said windings associated respectively with said magnetic elements for causing control current to flow therethrough, said control current varying the respective permeabilities of said magnetic elements, electrostatic storage means connected in a series path including said second pair of windings and a fourth pair of said windings associated respectively with said magnetic elements for causing reset current to flow therethrough, said reset current tending to switch said magnetic elements from their respective predetermined states to alternate reset conditions, said control current altering the effect of said reset current on said magnetic elements whereby the respective magnitudes of the magnetic flux reset in said magnetic elements are dissimilar, and means for sensing the dissimilarity in the magnitudes of the flux reset in said magnetic elements and for generating an output pulse having a duration and amplitude proportional to the amplitude of the control current responsible for such dissimilarity.

2. A magnetic amplifier comprising a pair of magnetic elements each capable of assuming bistable states of magnetic remanence, a switching winding and a regenerative winding coupled to each of said magnetic elements, a current amplifying devices operatively connected to cause current flow through both said switching windings and forming with both said regenerative windings a regeneratively coupled circuit, said circuit being adapted to switch said magnetic elements to respective predetermined opposite remanent states, a reset winding and a control winding coupled to each of said magnetic elements, means for energizing both said control windings by causing the flow of control current therethrough, circuit means for causing reset current to flow through both said reset windings for switching said magnetic elements from their respective predetermined states to alternate reset conditions, said control current altering the effect of said reset current on said magnetic elements whereby the respective magnitudes of the magnetic flux reset in said magnetic elements are dissimilar, and means for sensing the dissimilarity in the magnitude of the flux reset in said magnetic elements and for generating an output pulse having a duration and amplitude proportional to the amplitude of the control current responsible for such dissimilarity.

3. A magnetic amplifier comprising a pair of magnetic elements each capable of assuming bistable states of magnetic remanence, a switching winding and a regenerative winding coupled to each of said magnetic elements, a current amplifying device operatively connected to cause current flow through said switching windings and forming with said regenerative windings a regeneratively coupled circuit, said circuit being adapted to switch said magnetic elements to respective predetermined opposite remanent states, a reset winding and a control winding coupled to each of said magnetic elements, reset means coupled in a series path including said regenerative windings and said reset windings and adapted to store electrical energy during the switching of said magnetic elements by said regeneratively coupled circuit, said reset means being operative upon the termination of switching of both said magnetic elements to release said stored energy in the form of reset current flow through said windings, said reset current flow tending to switch said magnetic elements from their respective predetermined remanent states to alternate reset conditions, means for energizing said control windings by causing the flow of control current therethrough, said control current altering the effect of said reset current on said magnetic elements whereby the respective magnitudes of the magnetic flux reset in said magnetic elements are dissimilar, an output winding coupled to each of said magnetic elements, the switching of said magnetic elements from their respective reset conditions to their predetermined states by said regeneratively coupled circuit causing voltage pulses to be induced in the output windings associated therewith, the respective durations of said voltage pulses being a function of the degree of resetting of the magnetic flux of each of said magnetic elements, the difference in the durations of said voltage pulses being a function of the amplitude of said control current and representing the width of an output pulse, and means for utilizing said output pulse.

4. A magnetic amplifier as defined in claim 3 wherein said reset means consists of a capacitive storage element.

5. A magnetic amplifier comprising a pair of magnetic elements each capable of assuming bistable states of magnetic remanence, a switching winding and a regenerative winding coupled to each of said magnetic elements, a capacitive storage element, a current amplifying device having an input, an output and a common electrode, said common electrode being connected to a source of reference potential, said input electrode being connected in a series circuit comprising said capacitive storage element and said regenerative windings, the output electrode of said current amplifying device being connected in a series circuit comprising said switching windings, said current amplifying device being adapted to cause current flow through said switching windings for switching said magnetic elements to respective predetermined opposite remanent states, the switching of each of said magnetic elements inducing a voltage in the regenerative winding coupled thereto, said latter voltage being applied via said capacitive storage element to said input electrode of said current amplifying device and being of a regenerative polarity with respective to the conduction of said latter device, said capacitive element being adapted to store electrical energy during the switching of said magnetic elements by said current amplifying device, said capacitive element being operative upon the termination of switching of both said magnetic elements to release said stored energy and thereby to switch said magnetic elements from their respective predetermined remanent states to alternate reset conditions, means for applying to said magnetic elements a control signal current to be amplified, said control current altering the effect of said stored energy on said magnetic elements whereby the respective magnitudes of the magnetic flux reset in said magnetic elements are dissimilar, and means for sensing the dissimilarity in the magnitudes of the flux reset in said magnetic elements and for generating an output pulse having a duration and amplitude proportional to the amplitude of the control current responsible for such dissimilarity.

6. A magnetic amplifier comprising a pair of magnetic elements each capable of assuming bistable state of magnetic remanence, a switching winding and a regenerative winding coupled to each of said magnetic elements, a capacitive storage element, a current amplifying device having an input, an output and a common electrode, said common electrode being connected to a source of reference potential, said input electrode being connected in a series circuit comprising said capacitive element and said regenerative windings, the output electrode of said current amplifying device being connected in a series circuit comprising said switching windings, said current amplifying device being adapted to switch said magnetic elements to respective predetermined opposite remanent states, said capacitive element being adapted to store electrical energy during the switching of said magnetic elements by said current amplifying device, a reset winding and a control winding coupled to each of said magnetic elements, said reset windings being coupled in series with the input electrode of said current amplifying device, said capacitive element being operative upon the termination of switching of both said magnetic elements to release said stored energy in the form of reset current flow through said reset windings, said reset current flow tending to switch said magnetic elements from their respective predetermined remanent states to alternate reset conditions, said control windings being connected in a series circuit, means for energizing said control windings by causing the flow of control current therethrough, said control current altering the effect of said reset current on said magnetic elements whereby the magnitudes of the magnetic flux reset in said magnetic elements are dissimilar, and means for sensing the dissimilarity in the magnitudes in the flux reset in said magnetic elements and for generating an output pulse having a duration and amplitude proportional to the amplitude of the control current responsible for such dissimilarity.

7. A magnetic amplifier comprising a pair of magnetic elements each capable of assuming bistable states of magnetic remanence, a switching winding and a regenerative winding coupled to each of said magnetic elements, a capacitive storage element, a current amplifying device having an input, an output and a common electrode, said common electrode being connected to a source of reference potential, said input electrode being connected in a series circuit comprising said capacitive storage element and said regenerative windings, the output electrode of said current amplifying device being connected in a series circuit comprising said switching windings, said current amplifying device being adapted to cause current flow through said switching windings whereby said magnetic elements are switched to respective predetermined opposite remanent states, the switching of each of said magnetic elements inducing a voltage in the regenerative winding coupled thereto, said latter voltage being applied via said capacitive storage element to said input electrode of said current amplifying device and being of a regenerative polarity with respect to the condition of said latter device, said capacitive element being adapted to store electrical energy during the switching of said magnetic elements by said current amplifying device, a reset winding and a control winding coupled to each of said magnetic elements, said reset windings being coupled in series with the input electrode of said current amplifying device, said capacitive element being operative upon the termination of switching of both said magnetic elements to release said stored energy in the form of reset current flow through said reset windings, said reset current flow tending to switch said magnetic elements from their respective predetermined remanent states to alternate reset conditions, said control windings being connected in a series circuit, means for energizing said control windings by causing the flow of control current therethrough, said control current altering the effect of said reset current on said magnetic elements whereby the magnitudes of the magnetic flux reset in said magnetic elements are dissimilar, and means for sensing the dissimilarity in the magnitudes of the flux reset in said magnetic elements and for generating an output pulse having a duration and amplitude proportional to the amplitude of the control current responsible for such dissimilarity.

8. A magnetic amplifier comprising a pair of magnetic elements each capable of assuming bistable states of magnetic remanence, a switching winding and a regenerative winding coupled to each of said magnetic elements, a capacitor, a current amplifying device having an input, an output and a common electrode, said common electrode being connected to a source of reference potential, said input electrode being connected in a series circuit comprising said capacitor and said regenerative windings, the output electrode of said current amplifying device being connected in a series circuit comprising said switching windings, said current amplifying device being adapted to switch said magnetic elements to respective predetermined opposite remanent states, said capacitor storing an electrical charge during the switching of said magnetic elements by said current amplifying device, a reset winding and a control winding coupled to each of said magnetic elements, variable impedance means, said variable impedance means and said reset windings being coupled in a series circuit to the input electrode of said current amplifying device, the initial electrical charge on said capacitor appearing on said input electrode being operative upon the termination of switching of both said magnetic elements to prevent the conduction of said current amplifying device, said capacitor discharging through said variable impedance means and said reset windings, said discharge current flow tending to switch said magnetic elements from their respective predetermined remanent states to alternate reset conditions, said control windings being connected in a series circuit, means for energizing said control windings by causing the flow of control current therethrough, said control current altering the effect of said discharge current on said magnetic elements whereby the magnitudes of the magnetic flux reset in said magnetic elements are dissimilar, an output winding coupled to each of said magnetic elements, the resultant level of electrical charge on said capacitor after a period of discharge being such as to initiate the conduction of said current amplifying device, said latter conduction resulting in the switching of said magnetic elements from their respective reset conditions to their predetermined states and causing voltage pulses to be induced in the output windings associated therewith, the respective durations of said voltage pulses being a function of the degree of resetting of the magnetic flux of each of said magnetic elements, the difference in the durations of said voltage pulses being a function of the amplitude of said control current and representing the width of an output pulse, and means for utilizing said output pulse.

9. A magnetic amplifier as defined in claim 8 wherein said current amplifying device is a junction transistor and said input, output and common electrodes of said amplifying device correspond respectively to the base, collector and emitter electrodes of said transistor.

10. A magnetic amplifier for supplying energy to a load impedance comprising a pair of magnetic elements each capable of assuming bistable states of magnetic remanence; a switching winding, a regenerative winding, a reset winding, a control winding and an output winding coupled to each of said magnetic elements; a capacitor; voltage divider means having a movable contact; variable impedance means; a junction transistor having an emitter, a collector and a base electrode; the emitter electrode of said transistor being connected to a source of reference potential; the collector electrode of said transistor being connected to a first circuit comprising the series arrangement of said switching windings connected in parallel with said voltage divider means, said movable contact of said voltage divider means being connected to the junction of said switching windings; the base electrode of said transistor being connected in common to second and third circuits, said second circuit comprising in series said capacitor and said regenerative windings, said third circuit comprising in series said variable impedance means and said reset windings; a fourth circuit comprising in series said control windings, means for energizing said control windings by causing the flow of control current therethrough; and a fifth circuit comprising in series said output windings and said load impedance.

References Cited in the file of this patent

UNITED STATES PATENTS

| | | |
|---|---|---|
| 2,824,698 | Van Nice et al. | Feb. 25, 1958 |
| 2,902,609 | Ostroff et al. | Sept. 1, 1959 |
| 2,959,686 | Guterman | Nov. 8, 1960 |
| 2,963,688 | Amemiya | Dec. 6, 1960 |

UNITED STATES PATENT OFFICE
CERTIFICATE OF CORRECTION

Patent No. 3,117,235 January 7, 1964

Edward W. Young

It is hereby certified that error appears in the above numbered patent requiring correction and that the said Letters Patent should read as corrected below.

Column 6, line 47, for "devices" read -- device --; column 7, line 9, after "said", first occurrence, insert -- reset --; line 51, for "respective" read -- respect --; line 71, for "state" read -- states --; column 8, line 51, for "condition" read -- conduction --.

Signed and sealed this 9th day of June 1964.

(SEAL)
Attest:

ERNEST W. SWIDER
Attesting Officer

EDWARD J. BRENNER
Commissioner of Patents